M. McGONNIGLE.
Bee Hive.
No. 29,394.
Patented July 31, 1860.
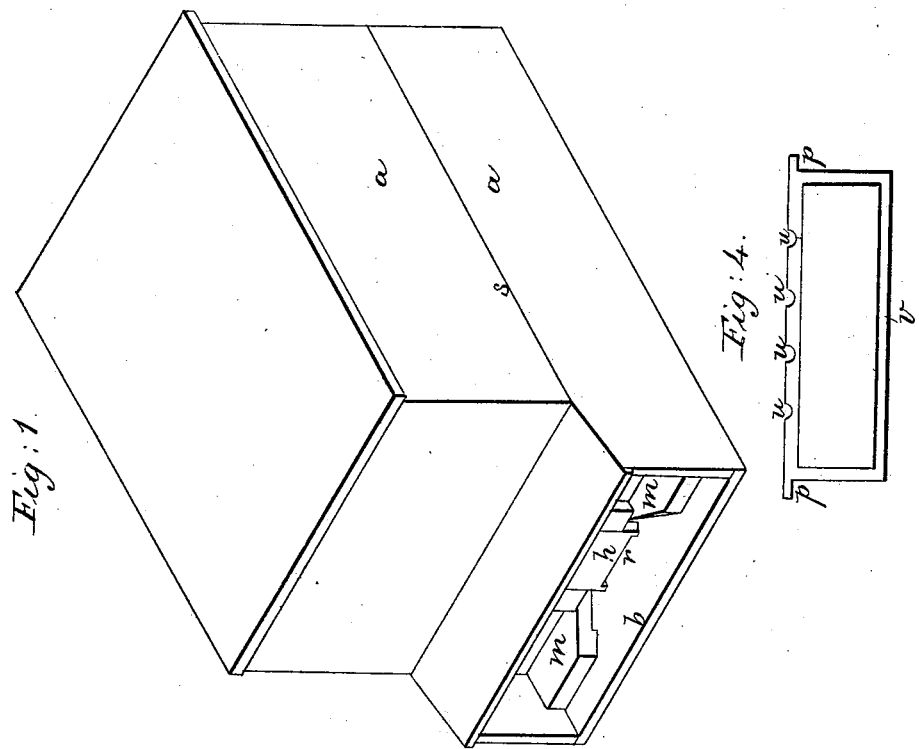
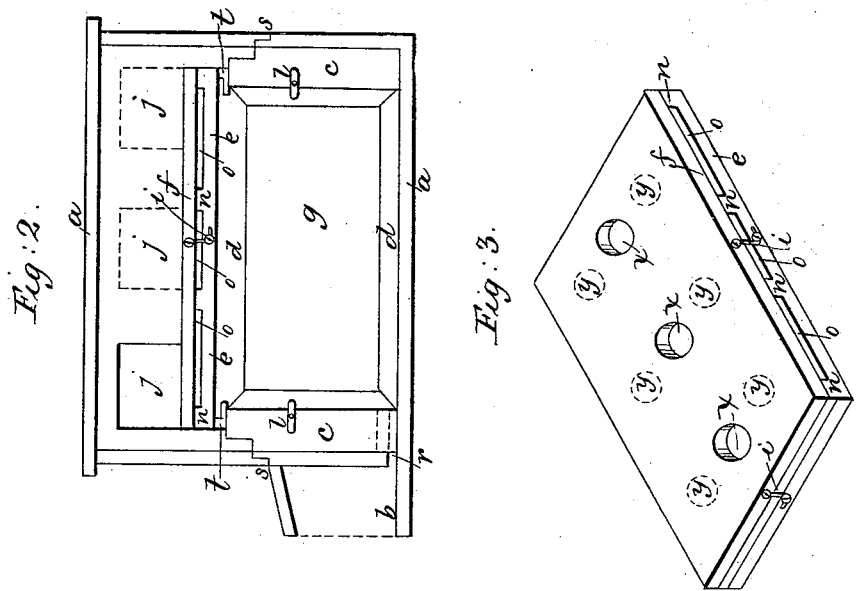
Witnesses.
James J. Johnston
George P. Steck
Inventor
Matthias McGonnigle

UNITED STATES PATENT OFFICE.

MATTHIAS McGONNIGLE, OF ALLEGHENY, PENNSYLVANIA.

BEEHIVE.

Specification of Letters Patent No. 29,394, dated July 31, 1860.

*To all whom it may concern:*

Be it known that I, MATTHIAS McGONNIGLE, of the city and county of Allegheny and State of Pennsylvania, have invented a new and useful Improvement in Beehives; and I do hereby declare that the following is a full and exact description thereof, reference being had to the accompanying drawings, and to the letters of reference marked thereon.

The nature of my invention consists in an arrangement for removing the side of the inner chamber or chambers of bee hives so that the frames to which the honey combs are attached may be removed without injury to the bees or honey combs, and also in the use of a double and perforated cover for the purpose of ventilating the different compartments of the hive and for preventing the queen from entering the upper compartment or compartments of the hive.

To enable others skilled in the art to make and use my invention I will proceed to describe its construction and operation.

In the accompanying drawings Figure 1, is a perspective view of the hive. Fig. 2, is a sectional view. Fig. 3, is a perspective view of the perforated cover. Fig. 4, is a side view of the frames for the honey comb.

(*a*) is the outer casing of the hive which is divided into two parts having the joint at (*s*).

(*b*) is the lighting board for the bees.

(*c*) are upright pieces to which the ends of the inner chamber are attached. One end of the inner chamber is furnished with an observing glass.

(*d*) are the movable sides of the inner chamber and are held in their proper position by means of buttons (*l*). The movable sides are furnished with glass marked (*g*).

(*t*) are strips on which the frames (*v*) rest, the frames (*v*) being supported by the projections (*p*).

(*u*) in the frames (*v*) are ways or passages for the bees.

The double and perforated cover consists of two pieces (*f* and *e*) and strips (*n*) which are secured to the bottom piece (*e*) for the purpose of forming ways or passages (*o*) for the bees. These passages should be made large enough to allow room for the working bees and too small to admit the queen. The passages (*o*) are also used for the purpose of ventilating the upper and lower compartments of the hive. The heated air of the lower compartment rises up and passes through the openings (*y*) in the bottom piece (*e*) and out through the ways or passages (*o*) into the space between the outside casing (*a*) and the inner chamber. The heated air from the upper compartment or compartments passes through the opening (*x*) in the top piece (*f*) and out through the passage (*o*) into the space between the inner chamber and the casing (*a*).

The top piece (*f*) and bottom piece (*e*) are held together by hooks (*i*).

By the arrangement of the openings (*y* and *x*) and the passages (*o*) in the double cover the working bees will not traverse or disturb the brood comb; and the queen is prevented from entering the spare honey in the upper compartment or compartments, and the hive is perfectly ventilated.

(*j*) represent honey receptacles placed over the openings (*x*) of the double cover.

(*m*) are moth traps.

(*h*) is a sliding door which is used for preventing the bees from swarming by keeping the queen in the hive.

(*r*) is the entrance to the hive.

The operation of my improvement is as follows: The bees enter the hive through the opening (*r*) and pass into the inner chamber and from it up through the opening (*y*) into the passages (*o*) and from them through the openings (*x*) into the spare honey department. In removing the honey, the sides (*d*) are removed and the frames to which the honey comb is attached are removed by taking them out sidewise.

Having thus described the nature construction and operation of my improvement, what I claim as of my invention and desire to secure by Letters Patent of the United States is—

1. The use of the movable sides (*d*) when used in connection with the inner chamber or chambers of the bee hives as herein described and for the purpose set forth.

2. The use of the double and perforated cover, when arranged and constructed as herein described and for the purpose set forth.

MATTHIAS McGONNIGLE.

Witnesses:
JAMES J. JOHNSTON,
GEORGE P. STECK.